(12) United States Patent
Girardon et al.

(10) Patent No.: US 7,613,378 B2
(45) Date of Patent: Nov. 3, 2009

(54) OPTICAL DEVICE COMPRISING AN OPTICAL COMPONENT AND AN OPTICAL MEDIUM WITH DIFFERENT REFRACTIVE INDICES

(75) Inventors: Valérie Girardon, Bretigny/Orge (FR); Isabelle Riant, Orsay (FR); Xavier Bonnet, St Remy les Chevreuse (FR); Alain Fradet, Issy-les-Moulineaux (FR); Hervé Lefebvre, Viroflay (FR)

(73) Assignee: ALCATEL, Paris (FR)

( * ) Notice: Subject to any disclaimer, the term of this patent is extended or adjusted under 35 U.S.C. 154(b) by 0 days.

(21) Appl. No.: 11/146,123

(22) Filed: Jun. 7, 2005

(65) Prior Publication Data
US 2005/0276541 A1 Dec. 15, 2005

(30) Foreign Application Priority Data
Jun. 8, 2004 (FR) .................................. 04 51127

(51) Int. Cl.
G02B 6/00 (2006.01)
(52) U.S. Cl. ........................................ 385/141; 385/37
(58) Field of Classification Search .................. 385/37, 385/129, 141–145, 147
See application file for complete search history.

(56) References Cited

U.S. PATENT DOCUMENTS

| 4,766,954 A | * | 8/1988 | Bierlein et al. ............... 427/164 |
| 6,163,641 A | * | 12/2000 | Eastgate ...................... 385/125 |
| 7,123,796 B2 | * | 10/2006 | Steckl et al. ................... 385/40 |
| 7,141,815 B2 | * | 11/2006 | Yankielun .................... 250/577 |
| 2003/0194182 A1 | | 10/2003 | Guerin ......................... 385/37 |
| 2005/0276541 A1 | * | 12/2005 | Girardon et al. .............. 385/37 |

FOREIGN PATENT DOCUMENTS

EP 1 372 006 A1 12/2003
WO WO 03/004727 A 1/2003

OTHER PUBLICATIONS

H. Labidi et al, "Dynamic Gain Control of Optical Amplifier Using an All-Fibre Solution", ECOC 2002. $28^{TH}$ European Conference on Optical communications. Post-Deadline Papers. Copenhagen, Denmark, Sep. 8-12, 2002, European conference on Optical Communication (ECOC) vol. Conf. 28, Sep. 12, 2002, p. PD18, XP001158370.
R. Del Sesto et al, "Modeling, synthesis, and characterization of third-order non-liner optical salts" Proceedings of the SPIE—The International Society for Optical Engineering SPIE-Int. Soc. Opt. Eng. USA, vol. 5212, No. 1, 2003, pp. 292-298 , XP002314187.

* cited by examiner

Primary Examiner—Kevin S Wood
(74) Attorney, Agent, or Firm—Sughrue Mion, PLLC

(57) ABSTRACT

The present invention consists in an optical device comprising an optical component and an optical medium with different refractive indices, said optical component being at least partly immersed in said optical medium, which device is characterized in that said optical medium contains a salt that is in the liquid state in the range of temperatures at which said optical component is used and stored, i.e. in a range of temperatures generally from −40° C. to +200° C. The optical component may in particular be a Bragg long-period grating (LPG) or a photonic crystal fiber.

28 Claims, 3 Drawing Sheets

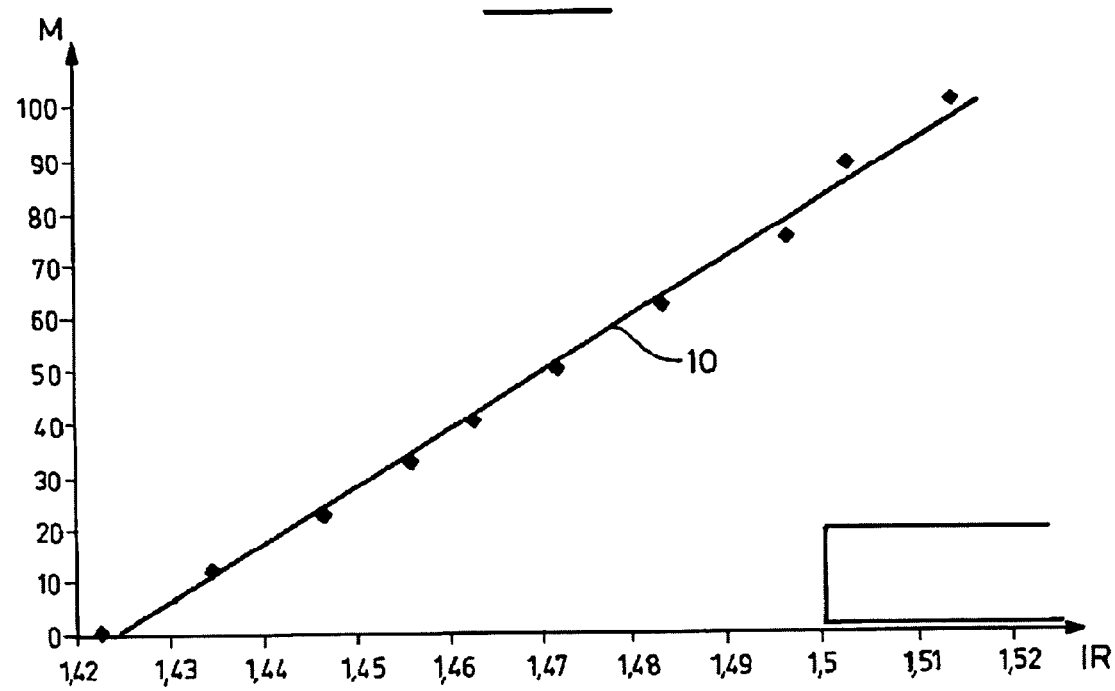
FIG_1
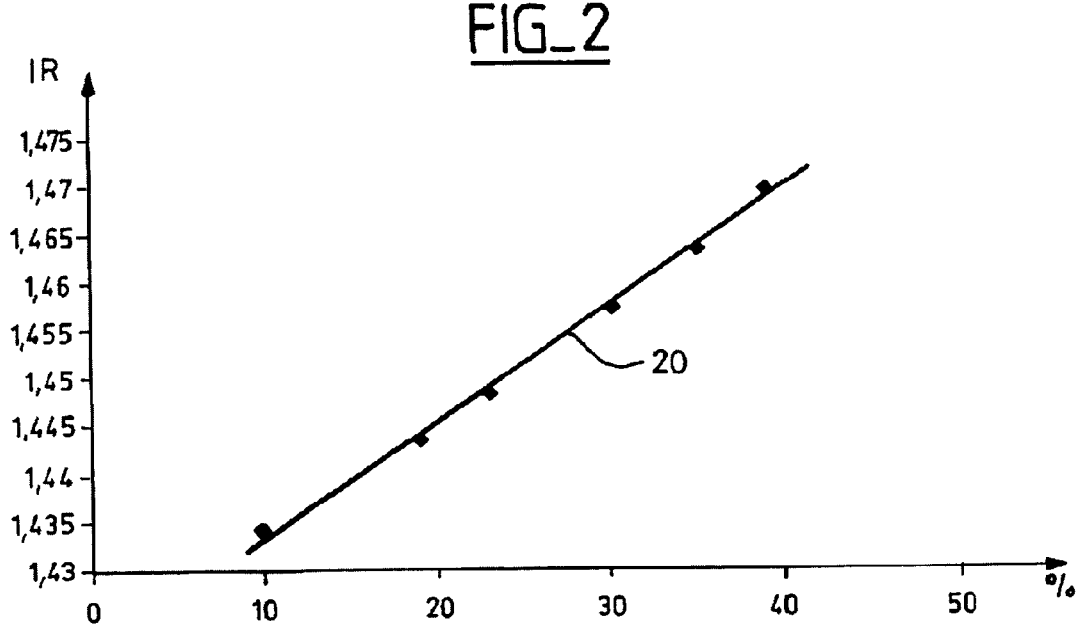
FIG_2

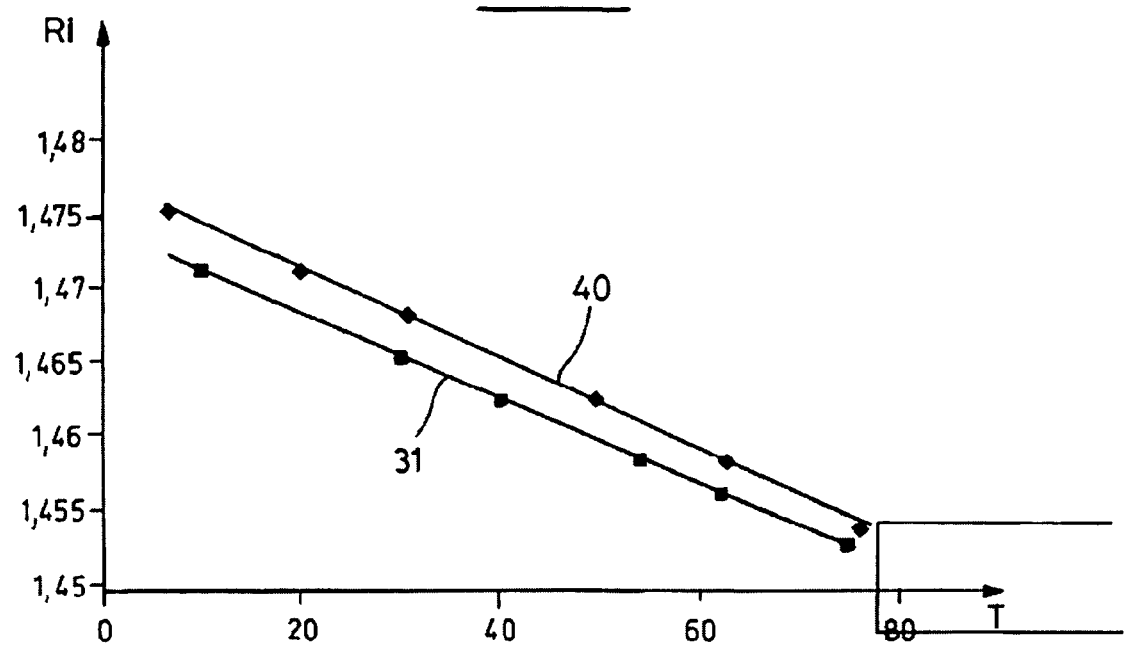
FIG_3
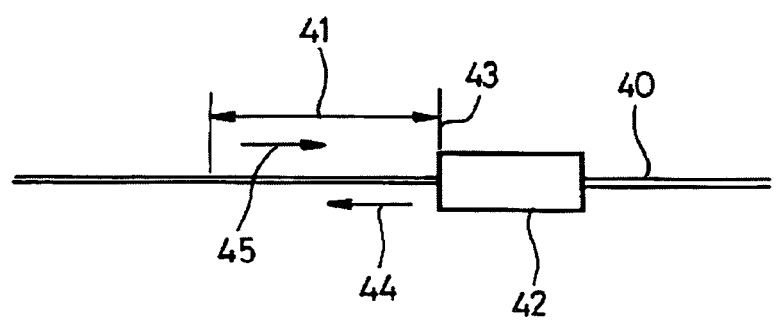
FIG_4

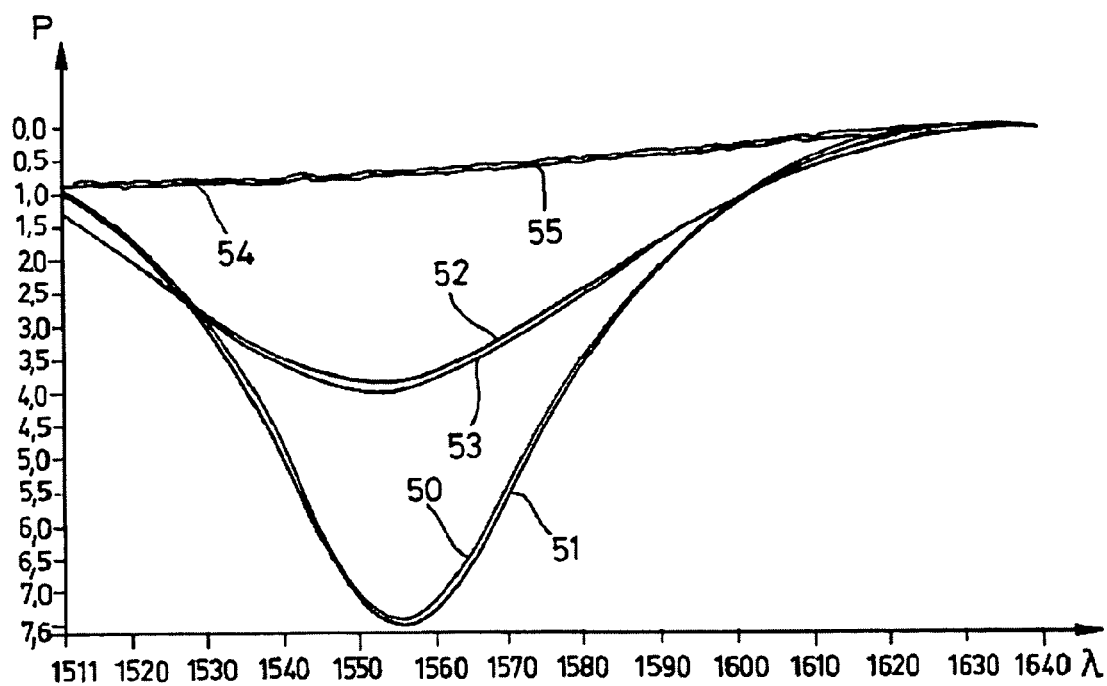

OPTICAL DEVICE COMPRISING AN OPTICAL COMPONENT AND AN OPTICAL MEDIUM WITH DIFFERENT REFRACTIVE INDICES

The present application claims foreign priority based on French Patent Application No. 04 51 127, filed Jun. 8, 2004, the content of which is incorporated herein by reference.

The present invention relates to optical devices that comprise an optical component and an optical medium with different refractive indices, and in which the optical properties of the optical component depend, at least in part, on the optical medium. The optical components may be bulk components or they may be integrated into waveguides such as optical fibers or planar waveguides. The fiber or plane waveguides may be of the photonic crystal type. The optical components may be short-period or long-period Bragg gratings, for example, having lines that are straight or slanted, couplers, Mach-Zehnder interferometers based on couplers, tapered fibers, or segments of specific fiber such as segments of photonic crystal fiber. The invention is described below by way of illustrative and non-limiting example in the more specific situation of optical devices comprising optical components consisting of Bragg gratings known as long-period gratings (LPG) used in dynamic gain equalizers, in particular in equalizer filters.

A waveguide conventionally comprises an optical core that has the function of transmitting an optical signal (and where applicable of amplifying it), and is surrounded by cladding that has the function of confining the optical signal in the core. To this end, the refractive index $n_1$ of the core is greater than the refractive index $n_2$ of the cladding. The core and the cladding together form a waveguide. As is well known in the art, the propagation of an optical signal in a monomode waveguide comprises propagation of a fundamental mode guided in the core and propagation of secondary modes, also known as cladding modes, guided in the core and cladding combination over a certain distance. The cladding is itself surrounded by an outer medium of refractive index $n_3$ different from $n_2$. The core and cladding combination associated with the outer medium forms a waveguide.

The core and/or the cladding of the waveguide may be doped, for example with germanium (Ge), to make it or them photosensitive with a view to writing a Bragg grating. The gratings conventionally used for gain equalization are slanted Bragg gratings (SBG) or long-period gratings (LPG), which are designed to couple the fundamental mode into the cladding modes. They therefore constitute filters with no reflection at the filtering wavelengths.

In the case of a long-period grating (LPG), the spectral response of the filter depends on the effective index $n_{effCore}$ of the fundamental mode guided in the core and the effective index $n_{effCladding}$ of the coupled cladding mode. The Bragg equation for long-period gratings is as follows, for example, where $\Lambda$ is the period of the LPG:

$$\lambda_B = \Lambda(n_{effCore} - n_{effCladding})$$

This feature of long-period gratings makes them particularly suitable for tunable filter applications, because localized action on the core, the cladding, and/or the medium external to the cladding can induce a modification of one of the effective indices and therefore of the Bragg length or the spectral shape of the filter. Moreover, insertion losses are low in that kind of filter, because it is easy to weld it to another component fiber or directly to the transmission fiber, and the methods known in the art of fabricating such filters yield very low polarization-dependent losses.

Gain equalizer filters, also known as gain flattening filters (GFF), are integrated into optical devices associated with optical amplifiers distributed regularly along transmission lines. Optical amplifiers generally do not apply equal amplification at all wavelengths, which is particularly problematical in the case of wavelength division multiplex (WDM) transmission, for which a plurality of signals at different wavelengths are transmitted over the same fiber and amplified by the same amplifiers. It is therefore necessary to associate the in-line amplifiers with gain equalizer filters that eliminate, or at least reduce, the amplification disparities of the various transmission channels of an optical system.

Optical systems often change, and it is by no means rare for the parameters of an optical component, such as a gain equalizer, to cease to be in any way suited to real transmission spectra. For example, such changes may be caused by aging, by temperature variations, localized work on the line, or by adding optical modules or optical transmission channels after installation of the line. The parameters of the various optical components of the optical system as set originally then become unsuitable.

It must therefore be possible to modify the properties of the optical component in order to adapt them to the changes in other components of the system, and it is therefore necessary to produce optical components whose spectral response can be tuned dynamically to correspond, over a wide spectral range and without loss, to the changes in the operating conditions of the optical systems that include them.

Total or partial immersion of a waveguide portion in an external medium whose refractive index is different from that of the cladding induces a modification of the interface conditions between the cladding and the outer medium. An LPG is particularly sensitive to modifications of the medium external to the cladding of the guide on which it is written.

The paper by H. LABIDI et al. "*Dynamic gain control of optical amplifier using an all-fiber solution*" presented at the 28th European Conference on Optics (8-12 Sep. 2002) proposes a device based on the dependency of the optical properties of an LPG on its immersion in a medium of given index different from that of the waveguide. In practice, at least one tank containing a liquid of given index slides along the grating to control the length thereof immersed in the liquid. It is therefore possible to modify the spectral response of the filter according to how much of the long-period grating is immersed in the external medium.

The optical media used are preferably liquid media. The prior art "CARGILLE" mixtures of solvents are unsuitable for use in the field of telecommunications. Firstly, they suffer rapid aging through evaporation (for example total evaporation at room temperature occurs within one week); an application in telecommunications requires a service life of at least 15 years in terrestrial networks and at least 25 years in submarine networks. Secondly, these solvents do not remain in the liquid state at low and high temperatures (they solidify at low temperatures and evaporate at high temperatures); optical telecommunication components are exposed to temperatures that can vary from −40° C. to +85° C., or even more.

Thus an object of the present invention is to propose an optical device in which the optical properties of the optical component, for example its spectral response, can be controlled, at least in part, by modifying the refractive index of the optical medium in such a manner as to adapt the optical properties of the optical component to the changes of other components of the optical system.

The present invention consists in an optical device comprising an optical component and an optical medium that have different refractive indices, said optical component being at least partly immersed in said optical medium, wherein said optical medium contains a salt that is in the liquid state in the range of temperatures at which said optical component is used and stored.

The temperature at which the salt is in a liquid state is preferably from −40° C. to +200° C. The operating temperature of an optical component usually varies from −10° C. to +70° C., but optical components are liable to be stored at temperatures from −40° C. to +85° C. The salt must therefore be in the liquid state over this temperature range and the device must not be degraded by a phase change of the salt, in particular by a change from the liquid phase to the solid phase.

The salts of the invention are in the liquid state over a wide temperature range including room temperature and are known as room-temperature ionic liquids (RTIL). They are known as "ionic liquids" because these salts, or mixtures of salts, contain dissociated species in ionic form.

The salts used in the present invention have the advantage of high electrical conductivity, thermal stability, and resistance to aging. They are also neither inflammable nor volatile. They have no boiling point as such because they are generally degraded at temperatures above 250° C. without changing to the vapour state.

Most of these salts have the advantage of reduced toxicity and of being miscible with cleaning solvents routinely employed during fabrication processes. The refractive index (measured at 1500 nanometers (nm) and at 589 nm before and after the test, for example) and the viscosity of most of the salts of the present invention are stable at high temperatures in the presence of water vapour (for example at +85° C. and 85% relative humidity).

The optical medium of the invention preferably contains a mixture of at least two salts. By "mixture" is meant either the additive combination of two salts each in the liquid state or a solution consisting of a first liquid salt associated with and in which there is dissolved a second salt initially in the solid state. The refractive index of the medium depends on the composition of the mixture of salts, which has the advantage that the required index is obtained very precisely, in particular over a range of refractive indices from 1.35 to 1.52 at 589 nm.

The refractive index of these salts varies with temperature, but only very slightly. In certain cases, this variation is too small to induce a variation in the response of the optical component. This is particularly beneficial if the spectral response of the optical component is varied by modifying the immersion of said optical component. This is the case in the example of the LPG described more specifically in the present document, in which the adaptation of the refractive index medium is induced by displacement of the area of contact between the component and the refractive index medium. In the case of an LPG, the variation of the refractive index with temperature has no impact on the shape of the filter under the conditions of use of a terrestrial optical component, namely at temperatures from −10° C. to +70° C. (i.e. over a temperature range of 80° C.). The spectral response of an LPG filter written in a fiber of suitable profile surrounded by a medium having an index of 1.46 or 1.47 shows no significant difference.

However, in some cases, the variation of the refractive index of the optical medium with temperature is sufficient to modify the response of the optical component. For example, if the variation of the refractive index with temperature is considered as high (for example from −20° C. to 120° C., i.e. over a range of 140° C.), the profile of a photonic crystal fiber may be adjusted according to the temperature of the optical medium, and transmission spectral variations may therefore be induced in the optical component. In the case of tunable optical components based on photonic crystal fiber, a significantly different spectral response has been observed for optical media whose refractive index varies from 1.46 to 1.48.

In a preferred embodiment of the invention, the salt comprises an anion and a cation.

The anion is preferably selected from a fluoride F—, a chloride Cl—, a bromide Br—, an iodide I—, a perchlorate $ClO_4$—, an aluminochlorate $AlClO_4$—, a tetrafluoroborate $BF_4$—, a hexafluorophosphate $PF_6$—, a hydrogenosulfate $HSO_4$—, a trifluoroacetate $CF_3COO$—, a heptafluoro-1-butanoate $C_3F_7COO$—, a trifluoromethanesulfonate $CF_3SO_3$— (or "triflate" TfO—), a nonafluorobutylsulfonate $C_4F_9SO_3$— (or "nonaflate" NfO—), a bis-trifluoromethanesulfonimide $(CF_3SO_2)_2N$— (or $Tf_2N$—), and a bis-trifluoromethane-sulfonemethide $(CF_3SO_2)_2C$— (or $Tf_2C$—).

The cation is preferably selected from ammonium $NH_4+$, sulfonium $HSO_3+$, phosphonium $PH_4+$, lithium Li+, pyridinium $C_5H_5NH+$, imidazolium cations $(C_3H_6N_2X^1X^2)+$, ammonium cations $(X^1X^2X^3X^4N_4)+$, sulfonium cations $(X^1X^2X^3S)+$, phosphonium cations $(X^1X^2X^3X^4P)+$, and pyridinium cations $(X^1C_5H_4NX^2)+$, where $X^1$, $X^2$, $X^3$, $X^4$ represent aromatic or aliphatic groups.

In a preferred embodiment of the invention, the salt is selected from salts of imadazolium. The cation of the salt is preferably N,N' dialkylimidazolium with the general formula:

in which $R^1$ and $R^2$ are aliphatic or aromatic groups coordinated with a counter-ion, for example an anion. $R^1$ and $R^2$ may be similar or different and contain at least one anion preferably selected from F—, Cl—, Br—, I—, $BF_4$—, $PF_6$—, $ClO_4$—, $AlClO_4$—, $CF_3COO$—, $C_3F_7COO$—, $CF_3SO_3$—, $C_4F_9SO_3$—, $(CF_3SO_2)_2N$—, $(CF_3SO_2)_2C$—, etc. As examples of aliphatic groups, the following may be mentioned: methyl —$CH_3$, ethyl —$C_2H_6$, propyl —$C_3H_7$, and butyl —$C_4H_9$.

In this case, the salt contains an anion preferably selected from Cl—, Br—, $PF_6$—, $BF_4$—, $(CF_3SO_2)_2N$—, $C_4F_9SO_3$—.

The salt has a different liquefaction temperature according to the nature of the groups $R^1$ and $R^2$ and the associated anion. It is therefore possible to select families of salts that are liquid at the temperatures of use and storage of the optical component.

Furthermore, the physico-chemical properties, and in particular the refractive index, of the salt can be tuned by modifying the $R^1$ and/or $R^2$ groups or the associated anion. It is known in particular that inserting fluorine atoms into the structure of the cation and of the anion reduces the refractive index. However, the presence of halogenated anions such as Br—, Cl— and I— increases the refractive index of the salt. A large selection of refractive indices is therefore obtained by mixing at least two salts or by dissolving a solid salt in another salt that is liquid at the operating temperature. It has been shown that the fabrication of this kind of mixture and the homogeneity of the mixture obtained are reproducible.

In one particular embodiment, the optical component is a Bragg long-period grating (LPG). In this case, the grating is preferably tuned by modifying the immersed portion. The optical response of the grating in contact with the medium of the invention is substantially constant over the range of use of the optical component, which extends from −10° C. to +70° C.

In another embodiment, the optical component is a segment of photonic crystal fiber. In this case, the response of the fiber is preferably tuned by varying the refractive index of the medium by means of a temperature variation, preferably in a range from −20° C. to +120° C.

Other features and advantages of the present invention become apparent in the course of the following description of embodiments of the invention given by way of illustrative and non-limiting example, and from the appended drawings, in which:

FIG. 1 represents the variation of the refractive index RI measured at a wavelength λ of 589 nm as a function of the mass M in % of one of the salts constituting a mixture of two salts that are liquid at room temperature, FIG. 2 represents the variation of the refractive index RI measured at a wavelength λ of 589 nm as a function of the mass M in % of one of the salts constituting a solution of a salt that is solid at room temperature in a salt that is liquid at room temperature, FIG. 3 shows, for the same mixture, the variation of the refractive index RI measured at a wavelength λ of 589 nm as a function of temperature T in degrees Celsius, FIG. 4 is a simplified diagram of one embodiment of a long-period grating LPG immersed in a tunable index medium of the invention, and FIG. 5 shows the transmission spectral response of a long-period grating LPG as a function of its immersion in a tunable index medium of the invention; the normalized power P in dBm is plotted on the ordinate axis and the wavelength λ in nm is plotted on the abscissa axis.

EXAMPLES 1 TO 9

The following examples concern the influence of the composition of the mixture of two salts on the refractive index of the mixture.

In FIG. 1, the curve 10 shows the variation of the refractive index that it is possible to obtain with a variable composition mixture of two salts that are liquid at room temperature. The mixture comprises a first salt HMIM,Cl and a second salt BMIM,BF$_4$. The variation of the refractive index IR is represented as a function of the mass M of the first salt HMIM,Cl expressed as a percentage by weight of the mixture. This linear variation shows that the miscibility of the two salts is correct. On selecting the most appropriate composition of the mixture on the basis of these curves, these mixtures provide an index from 1.46 to 1.48 in a temperature range including room temperature.

Table 1 below gives the refractive index values measured at 589 nm and 20.0° C. of the mixture of two liquid salts HMIM, Cl and BMIM,BF$_4$ according to the proportions by weight of the two constituents. The quantity of each salt is expressed as a percentage by weight. Note the correct linear relationship between the refractive index IR and the proportions of the constituents of the binary mixture.

TABLE 1

| Example | HMIM, Cl in % | BMIM, BF$_4$ in % | IR |
|---|---|---|---|
| 1 | 87.9 | 12.1 | 1.5027 |
| 2 | 74.5 | 25.5 | 1.4932 |
| 3 | 62.1 | 37.9 | 1.4831 |
| 4 | 50.5 | 49.5 | 1.4714 |

TABLE 1-continued

| Example | HMIM, Cl in % | BMIM, BF$_4$ in % | IR |
|---|---|---|---|
| 5 | 50.6 | 49.4 | 1.4711 |
| 6 | 40.1 | 59.9 | 1.4623 |
| 7 | 32.4 | 67.6 | 1.4559 |
| 8 | 22.8 | 77.2 | 1.4463 |
| 9 | 12.3 | 87.7 | 1.4345 |

EXAMPLE 10

The following example concerns a mixture of an initially solid salt BMIM,Br dissolved in a liquid salt BMIM,BF$_4$. Curve 20 in FIG. 2 shows the variation of the refractive index as a function of the composition of the binary mixture BMIM, BF$_4$/BMIM,Br.

Note the correct linear relationship between the refractive index and the proportions of the constituents of the binary mixture.

EXAMPLES 11 AND 12

The following examples concern the influence of temperature on the refractive index of the mixture of the two liquid salts.

FIG. 3 relates to two mixtures 11 and 12 of two liquid salts for which the refractive index variation was measured as a function of temperature.

The mixture 11 (curve 30) contained 48.2% by weight of a salt HMIM,Cl and 51.8% by weight of a salt BMIM,PF$_6$ from SOLVENT INNOVATION. At a wavelength of 589 nm the mixture A had a refractive index of 1.4659 at a temperature of 20° C. and of 1.4773 at a temperature of 0° C.

The mixture 12 (curve 31) contained 50.5% by weight of a salt HMIM,Cl and 49.5% by weight of a reference salt BMIM,BF$_4$. At a wavelength of 589 nm the mixture B had a refractive index of 1.4714 at a temperature of 20° C. and of 1.4741 at a temperature of 0° C.

Note that, in both cases, the variation is linear and decreasing as the temperature rises, with a slope dn/dT of the order of $-3 \times 10^{-4}$.

EXAMPLES 13 TO 17

The stability of the refractive index of salts or mixtures of salts according to the invention exposed to wet heat was tested at high temperature (+85° C.) and in the presence of moisture (85% relative humidity).

The results are set out in Table 2 below. The refractive index IR was measured before and after the test at 589 nm and at 20.0° C. The weight of the sample was measured before and after the test and this gravimetric tracking is represented by the percentage mass variation Δm, defined as follows:

$$\Delta m = 100 \times \frac{\text{initial mass of substance} - \text{mass of substance after test}}{\text{initial mass of substance}}$$

TABLE 2

| Example | formula | Δm | IR before test | IR after test |
|---|---|---|---|---|
| 13 | BMIM, PF$_6$ | 0.3% | 1.4108 | 1.4103 |
| 14 | BzMIM, BF$_4$/BzBMIM, Br | 0.7% | 1.4742 | 1.4744 |

TABLE 2-continued

| Example | formula | Δm | IR before test | IR after test |
|---|---|---|---|---|
| 15 | BMIM, BF$_4$/BzMIM, BF$_4$ | 0.3% | 1.4632 | 1.4683 |
| 16 | BMIM, BF$_4$/BMIM,Br | 0.7% | 1.4610 | 1.4596 |
| 17 | BMIM, NfO | — | 1.4038 | 1.4034 |

Note that the refractive index remains constant before and after the test, as do the surface tension and the viscosity of the salt or mixture of salts. Moreover, in a moist environment and at high temperature, these ionic liquids show good stability, as the increase in mass remains very low (Δm<1%). The absorption of moisture by the salts is very moderate, and does not induce any modification of their physico-chemical and optical properties.

EXAMPLE 18

In one particular embodiment of the present invention, the optical medium may contain, for example, a salt of N,N' dialkylimidazolium associated with a BF$_4$— anion whose R$^1$ and R$^2$ groups are respectively a methyl group and a butyl group. Its crystallization temperature is then −80° C. This salt has anti-electrostatic properties that are particularly beneficial in the envisaged application to telecommunications. By way of comparison, if the methyl group is replaced by an ethyl or butyl group, the crystallization temperature of the salt becomes +15° C., which makes it more difficult to use.

EXAMPLE 19

The following example concerns the influence of the immersion of a long-period grating LPG in a liquid medium of the invention. The immersion of the LPG in the medium may be varied in particular by means of a device analogous to that described in the paper by H. LABIDI et al. "*Dynamic gain control of optical amplifier using an all-fiber solution*" presented at the 28th European Conference on Optics (8-12 Sep. 2002).

FIG. 4 is a simplified diagram of an optical fiber 40 on a portion 41 of which a long-period grating LPG has been written. This portion 41 may be at least partly immersed in a medium of the invention that contains a liquid salt and is contained in a tank 42 adapted to be moved along the fiber 40. Here the tank 42 is shown in an initial position 43 in which the portion 41 carrying the grating is not immersed in the medium (zero displacement). The tank 42 may be moved in a "go" direction represented by the arrow 44 to immerse the portion 41 progressively in the medium contained in the tank 42. The tank 42 may also be moved in the opposite or "return" direction represented by the arrow 45.

FIG. 5 represents the spectral response of a long-period grating LPG of total length 30 mm immersed in a medium having an index of 1.404 at room temperature (20° C.). The curves 50 and 51 correspond to zero displacement (initial position) and show the response measured in the go and return directions, respectively. The curves 52 and 53 correspond to a displacement of 4 mm from the initial position, the response being measured on reaching this position during a displacement in the go direction and a displacement in the return direction, respectively. The curves 54 and 55 correspond to a displacement of 8 mm from the initial position, the response being measured in the go direction and in the return direction, respectively. By displacing the immersed area of the written long-period grating, a continuous and reversible variation of the contrast is observed with no change in the Bragg wavelength.

What is claimed is:

1. An optical device, comprising an optical component and an optical medium that have different refractive indices, and wherein the optical properties of the optical component depend at least in part on the optical medium, said optical medium being external to said optical component and comprising one of (i) a salt that in the absence of a solvent is itself in the liquid state in the range of temperatures at which said optical component is used and stored or (ii) a mixture of salts that in the absence of a solvent other than one of said salts is itself in the liquid state in the range of temperatures at which said optical component is used and stored, and said optical component being at least partly immersed in said optical medium.

2. A device according to claim 1, wherein said range of temperatures is from −40° C. to +200° C.

3. A device according to claim 1, wherein said range of temperatures is from −40° C. to +85° C.

4. A device according to claim 1, wherein said range of temperatures is from −20° C. to +120° C.

5. A device according to claim 1, wherein said range of temperatures is from −10° C. to +70° C.

6. A device according to claim 1, wherein said medium consists of a mixture of at least two salts.

7. A device according to claim 6, wherein said mixture contains a first salt in the liquid state and a second salt dissolved in said first salt.

8. A device according to claim 6, wherein the composition of said mixture remains stable over time.

9. A device according to claim 1, wherein said salt or a salt of said mixture of salts contains an anion and a cation.

10. A device according to claim 9, wherein said anion is selected from a fluoride F—, a chloride Cl—, a bromide Br—, an iodide I—, an aluminochlorate AlClO$_4$—, a perchlorate ClO$_4$—, a tetrafluoroborate BF$_4$—, a hexafluorophosphate PF$_6$—, a hexafluoroarsenate AsF$_6$—, a hydrogenosulfate HSO$_4$—, a trifluoroacetate CF$_3$COO—, a heptafluoro-1-butanoate C$_3$F$_7$COO—, a trifluoromethanesulfonate CF$_3$SO$_3$— (or "triflate" TfO—), a nonafluorobutylsulfonate C$_4$F$_9$SO$_3$— (or "nonaflate" NfO—), a bis-trifluoromethanesulfonimide N(CF$_3$SO$_2$)$_2$— (or Tf$_2$N—), and a bis-trifluoromethanesulfonemethide C(CF$_3$SO$_2$)$_2$— (or Tf$_2$C—).

11. A device according to claim 9, wherein said cation is selected from ammonium NH$_4$+, sulfonium HSO$_3$+, phosphonium PH$_4$+, lithium Li+, pyridinium C$_5$H$_5$NH+, imidazolium cations (C$_3$H$_6$N$_2$X$^1$X$^2$)+, ammonium cations (X$^1$X$^2$X$^3$X$^4$N$_4$)+, sulfonium cations (X$^1$X$^2$X$^3$S)+, phosphonium cations (X$^1$X$^2$X$^3$X$^4$P)+, and pyridinium cations (X$^1$C$_5$H$_4$NX$^2$)+, where X$^1$, X$^2$, X$^3$, X$^4$ represent aromatic or aliphatic groups.

12. A device according to claim 9, wherein said salt or said salt of said mixture of salts has for the cation N,N' dialkylimidazolium with the following general formula, in which R$^1$ and R$^2$ are aliphatic or aromatic groups containing an anion:

13. A device according to claim 12, where R$^1$ and R$^2$ are similar or different and each contains an anion selected from F—, Cl—, Br—, I—, BF$_4$—, PF$_6$—, AsF$_6$, ClO$_4$—, $AlClO_4$—, $CF_3COO$—, $C_3F_7COO$—, $CF_3SO_3$—, $C_4F_9SO_3$—, $(CF_3SO_2)_2N$—, $(CF_3SO_2)_2C$—.

14. A device according to claim 12, wherein $R^1$ and $R^2$ are similar or different and are an aliphatic group selected from methyl —$CH_3$, ethyl —$C_2H_6$, propyl —$C_3H_7$ and butyl —$C_4H_9$.

15. A device according to claim 14, wherein said salt or said salt of said mixture contains an anion selected from Cl—, Br—, $PF_6$—, $BF_4$—, $(CF_3SO_2)_2N$—, and $C_4F_9SO_3$—.

16. A device according to claim 1, wherein said optical component is a Bragg long-period grating (LPG).

17. A device according to claim 16, wherein said grating is tuned by modifying the immersion of the optical component in said medium.

18. A device according to claim 16, wherein the optical response of said grating is substantially constant over said range of temperatures.

19. A device according to claim 18, wherein said range of temperatures is from −10° C. to +70° C.

20. A device according to claim 1, wherein said optical component is a length of photonic crystal fiber.

21. A device according to claim 20, comprising a temperature control unit for controlling the value of the refractive index of the medium.

22. A device according to claim 21, wherein the temperature control unit is adapted to subject said medium to a temperature from −20° C. to +120° C.

23. A device according to claim 1, wherein said salt or mixture of salts comprises a room temperature ionic liquid.

24. A device according to claim 1, wherein said optical medium consists of said salt or mixture of salts.

25. A device according to claim 1, wherein said medium comprises a salt that in the absence of a solvent is itself in the liquid state over said range of temperatures.

26. A device according to claim 25, wherein said optical medium comprises a mixture of salts.

27. A device according to claim 25, wherein said salt has a melting temperature below said range of temperatures.

28. A device according to claim 25, wherein said salt has a melting temperature no greater than −10°C.

* * * * *